US012076290B2

(12) United States Patent
Lee et al.

(10) Patent No.: US 12,076,290 B2
(45) Date of Patent: *Sep. 3, 2024

(54) MOTION ASSISTANCE APPARATUS

(71) Applicants: Samsung Electronics Co., Ltd., Suwon-si (KR); Research & Business Foundation Sungkyunkwan University, Suwon-si (KR)

(72) Inventors: Minhyung Lee, Seoul (KR); Byungjune Choi, Gunpo-si (KR); Jeonghun Kim, Suwon-si (KR); Se-Gon Roh, Suwon-si (KR); Youn Baek Lee, Yongin-si (KR); Jongwon Lee, Suwon-si (KR); Hyun Do Choi, Yongin-si (KR); Jung Yun Choi, Suwon-si (KR); Hyouk Ryeol Choi, Suwon-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 43 days.

This patent is subject to a terminal disclaimer.

(21) Appl. No.: 17/747,096

(22) Filed: May 18, 2022

(65) Prior Publication Data

US 2022/0273514 A1 Sep. 1, 2022

Related U.S. Application Data

(63) Continuation of application No. 15/828,696, filed on Dec. 1, 2017, now Pat. No. 11,357,689.

(30) Foreign Application Priority Data

Aug. 23, 2017 (KR) ........................ 10-2017-0106684

(51) Int. Cl.
*A61H 1/02* (2006.01)
*A61H 1/00* (2006.01)
*A61H 3/00* (2006.01)

(52) U.S. Cl.
CPC ............. *A61H 1/0244* (2013.01); *A61H 1/00* (2013.01); *A61H 1/0218* (2013.01);
(Continued)

(58) Field of Classification Search
CPC ...... A61H 2201/0176; A61H 2201/018; A61H 2201/0192; A61H 2201/12;
(Continued)

(56) References Cited

U.S. PATENT DOCUMENTS 7,473,235 B2 1/2009 Schwenn et al.
9,554,960 B2 * 1/2017 Kamon .................... A61H 3/00
(Continued)

FOREIGN PATENT DOCUMENTS

CN 103200919 A 7/2013
CN 104363955 A 2/2015
(Continued)

OTHER PUBLICATIONS

U.S. Appl. No. 15/828,696, filed Dec. 1, 2017; Lee et al.
(Continued)

*Primary Examiner* — Alyssa M Alter
*Assistant Examiner* — Jessandra F Hough
(74) *Attorney, Agent, or Firm* — NIXON & VANDERHYE P.C.

(57) ABSTRACT

A motion assistance apparatus includes a force transmitting frame configured to support a distal part of a user, a slider configured to slide in the force transmitting frame, and a driving frame connected to the slider and configured to slide with respect to a proximal part of the user.

15 Claims, 15 Drawing Sheets

(52) U.S. Cl.
CPC ............. *A61H 1/0281* (2013.01); *A61H 3/00* (2013.01); *A61H 2003/007* (2013.01); *A61H 3/008* (2013.01); *A61H 2201/0176* (2013.01); *A61H 2201/018* (2013.01); *A61H 2201/0192* (2013.01); *A61H 2201/12* (2013.01); *A61H 2201/14* (2013.01); *A61H 2201/1616* (2013.01); *A61H 2201/1628* (2013.01); *A61H 2201/163* (2013.01); *A61H 2201/1635* (2013.01); *A61H 2201/164* (2013.01); *A61H 2201/1642* (2013.01); *A61H 2201/165* (2013.01); *A61H 2201/1671* (2013.01); *A61H 2201/50* (2013.01); *A61H 2201/5061* (2013.01); *A61H 2205/108* (2013.01)

(58) Field of Classification Search
CPC ........ A61H 2201/14; A61H 2201/1616; A61H 2201/1628; A61H 2201/163; A61H 2201/1635; A61H 2201/164; A61H 2201/1642; A61H 2201/165; A61H 2201/1671; A61H 2201/50; A61H 2201/5061; A61H 2205/108; A61H 1/0244; A61H 1/00; A61H 1/0218; A61H 3/00; A61H 3/008
See application file for complete search history.

(56) References Cited

U.S. PATENT DOCUMENTS

| | | | | |
|---|---|---|---|---|
| 2006/0064047 | A1* | 3/2006 | Shimada | A61F 5/0102 602/26 |
| 2011/0160626 | A1 | 6/2011 | Takahashi et al. | |
| 2012/0226203 | A1 | 9/2012 | Nakashima et al. | |
| 2015/0321339 | A1 | 11/2015 | Asbeck et al. | |
| 2015/0335514 | A1* | 11/2015 | Choi | A61H 1/0244 623/27 |
| 2016/0081870 | A1 | 3/2016 | Lee et al. | |
| 2016/0151227 | A1* | 6/2016 | Choi | F16B 7/22 623/27 |
| 2017/0143574 | A1 | 5/2017 | Choi et al. | |

FOREIGN PATENT DOCUMENTS

| | | | |
|---|---|---|---|
| CN | 105435426 | A | 3/2016 |
| CN | 105579014 | A | 5/2016 |
| CN | 109803730 | B | 5/2019 |
| EP | 1 792 597 | B1 | 7/2015 |
| JP | 2006-087478 | A | 4/2006 |
| JP | 2013-173190 | A | 9/2013 |
| JP | 5878660 | B1 | 3/2016 |
| KR | 10-1283143 | B1 | 7/2013 |
| KR | 10-2015-0127002 | A | 11/2015 |
| KR | 10-2016-0034174 | A | 3/2016 |
| KR | 2017-0028718 | A | 3/2017 |
| KR | 2017-0037428 | A | 4/2017 |
| WO | WO2006022057 | A1 | 3/2006 |

OTHER PUBLICATIONS

Chinese Office Action dated Feb. 5, 2021 issued in corresponding Chinese Patent Application No. 201880003018.3.
Extended European Search Report dated Apr. 14, 2020 issued in European Patent Application No. 18847344.1.
International Search Report dated Nov. 28, 2018 issued in corresponding International Patent Application No. PCT/KR2018/009639.
Korean Office Action dated Jun. 27, 2022 for KR Application No. 10-2017-0106684.
Chinese Office Action dated Oct. 12, 2023 for CN Application No. 202111393514.4.

* cited by examiner

MOTION ASSISTANCE APPARATUS

CROSS-REFERENCE TO RELATED APPLICATION

This application is a Continuation of U.S. application Ser. No. 15/828,696, filed Dec. 1, 2017, which claims priority to KR 10-2017-0106684, filed on Aug. 23, 2017, the entire contents of which are all hereby incorporated herein by reference in their entireties.

BACKGROUND

1. Field

At least one example embodiment relates to a motion assistance apparatus.

2. Description of the Related Art

With the onset of rapidly aging societies, an increasing number of people may experience any substantial inconvenience and/or pain from joint problems. Thus, there is a growing interest in motion assistance apparatuses enabling the elderly and/or patients having joint problems to walk with less effort.

SUMMARY

Some example embodiments relate to motion assistance apparatuses.

In an example embodiment, the motion assistance apparatus includes a force transmitting frame having a sliding space therein, the force transmitting frame configured to support a distal part of a user, a slider configured to slide in the sliding space, and a driving frame connected to the slider, and configured to slide with respect to a proximal part of the user.

The motion assistance apparatus may further include a plurality of elastic members configured to connect the force transmitting frame and the slider.

At least one of the plurality of elastic members may expand or contract when a distance between the slider and a center of the force transmitting frame changes.

The slider may include a body plate in the sliding space, and at least one slip plate attached to any one or any combination of a top surface and a bottom surface of the body plate.

The at least one slip plate may include a friction reducer configured to reduce a friction between the slip plate and the force transmitting frame.

At least one of the slider and the driving frame may include a connecting member configured to connect the slider and the driving frame.

The force transmitting frame may include an opening through which the connecting member passes.

At least a portion of the slider may be configured to overlap the force transmitting frame based on a direction perpendicular to the opening.

The force transmitting frame and the slider may be bent in one direction.

The force transmitting frame may be bent in a direction to cover the distal part of the user.

A thickness of the slider and a height of the sliding space may be uniform, and a curvature of the force transmitting frame may be substantially equal to a curvature of the slider.

The slider may be configured to perform a 2-degree of freedom (DOF) motion in two intersecting directions in the sliding space.

The motion assistance apparatus may further include a strap configured to be attached to and detached from both sides of the force transmitting frame.

The force transmitting frame may include strap hooks protruding from both sides thereof, and the strap may include a plurality of strap slots at intervals in a length direction thereof. Each of the strap hooks may be inserted into a corresponding one of the plurality of strap slots.

The motion assistance apparatus may further include an actuator connected to one end of the driving frame, and configured to drive the driving frame.

The motion assistance apparatus may further include a sensor configured to sense at least one of a force or a torque applied between the driving frame and the slider, and a controller configured to control the actuator based on information measured by the sensor.

The distal part may be a thigh of the user, and the proximal part may be any one or any combination of a waist and a pelvis of the user.

Another example embodiment relates to a motion assistance apparatus.

In an example embodiment, the motion assistance apparatus includes a proximal support configured to support a proximal part of a user, a force transmitting frame having a sliding space therein, the force transmitting frame configured to support a distal part of the user, a slider configured to slide in the sliding space, and a driving frame connected to the slider, and configured to rotate relative to the proximal support.

The slider may be configured to perform a 2-DOF motion in two intersecting directions in the sliding space.

The motion assistance apparatus may further include an actuator configured to rotate the driving frame on a first axis with respect to the proximal support, and a hinge configured to rotate the driving frame on a second axis with respect to the proximal support, the second axis intersecting the first axis.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects of the inventive concepts will become apparent and more readily appreciated from the following description of example embodiments, taken in conjunction with the accompanying drawings of which.

DETAILED DESCRIPTION

Figure 1:
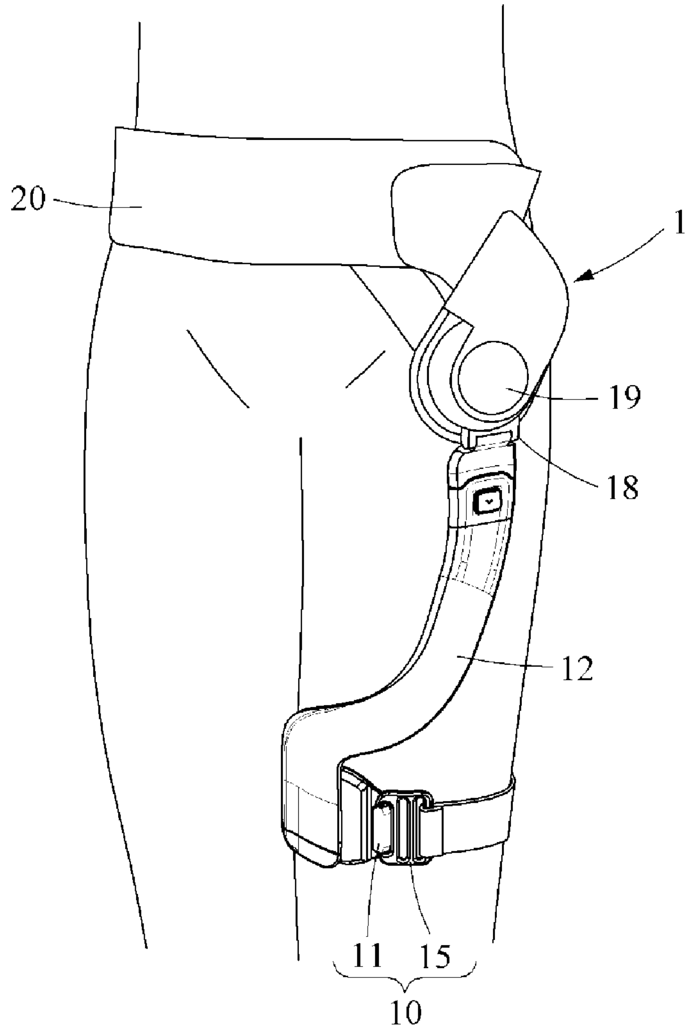
FIG. 1 illustrates a user wearing a motion assistance apparatus according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

Figure 2:
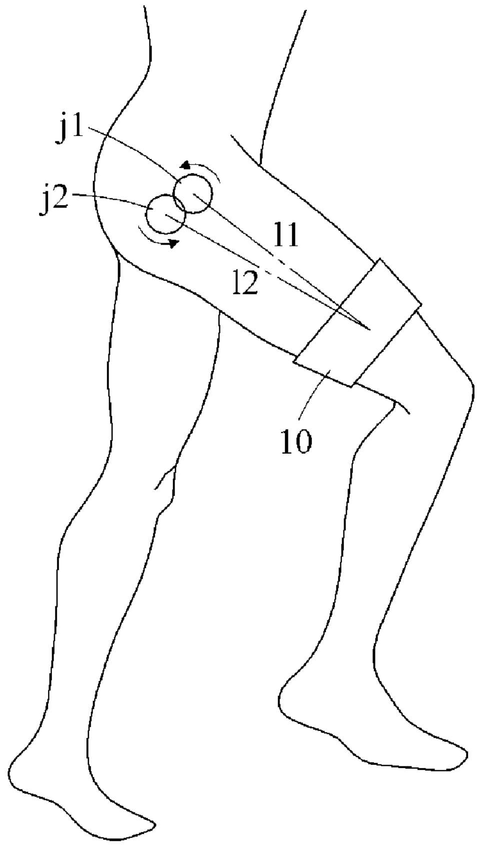
FIG. 2 illustrates a center of a hip joint moving on a sagittal plane when a user performs a flexion motion or an extension motion of a thigh.
Figure 3A:
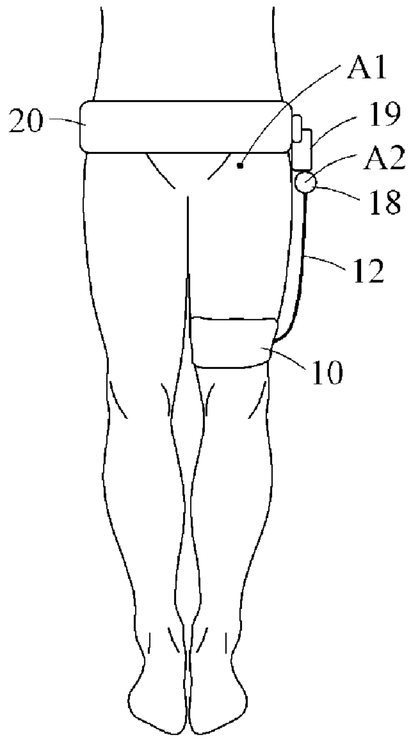
FIGS. 3A and 3B illustrate a misalignment between a joint of a user and a joint of a motion assistance device on a frontal plane.
Figure 3B:
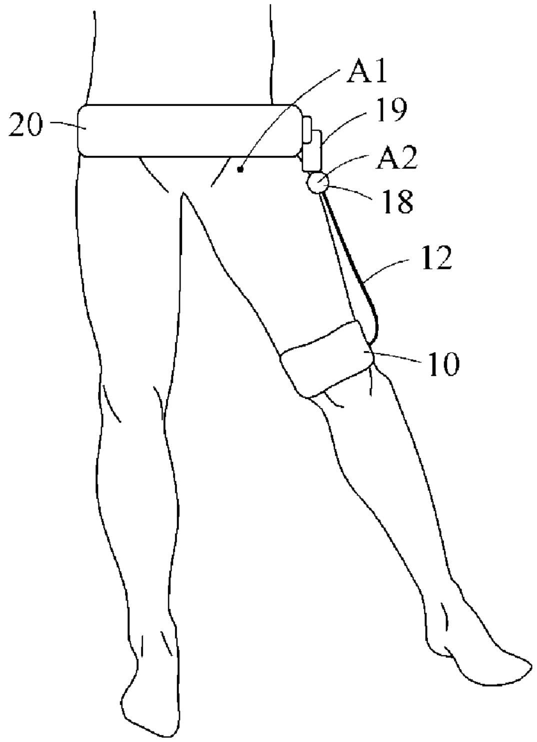

FIG. 1 illustrates a user wearing a motion assistance apparatus according to at least one example embodiment. FIG. 2 illustrates a center of a hip joint moving on a sagittal plane when the user performs a flexion motion or an extension motion of a thigh. FIGS. 3A and 3B illustrate a misalignment between a joint of the user and a joint of the motion assistance device on a frontal plane.

Referring to FIGS. 1 through 3, a motion assistance apparatus 1 may be worn by a user to assist a motion of the user. The user may correspond to a human, an animal, or a robot. However, the user is not limited thereto. The motion assistance apparatus 1 may include a distal support 10, a proximal support 20, a driving frame 12 configured to move the distal support 10 relative to the proximal support 20, an actuator 19 configured to drive the driving frame 12, and a hinge 18 configured to connect the actuator 19 and the driving frame 12.

The distal support 10 and the proximal support 20 may be on opposite sides of a part of the user to support a distal part and a proximal part, respectively. The distal part may be a thigh of the user, and the proximal part may be a waist and/or a pelvis of the user. For example, the distal support 10 may support the thigh, and the proximal support 20 may support a part above the thigh, for example, the waist and/or the pelvis. The distal support 10 may include a detachable belt to support the entire thigh of the user, and the proximal support 20 may include a detachable belt to support the entire waist and/or the entire pelvis of the user.

In another example embodiment, the distal support 10 may support a forearm, and the proximal support 20 may support a shoulder and/or a back. The distal support 10 may include a detachable belt to support the entire forearm of the user or include a structure that encloses the entire forearm, and the proximal support 20 may include a detachable belt to support the entire shoulder of the user. Hereinafter, for ease of description, the description will be provided based on a case in which the distal support 10 supports the thigh of the user. However, a part supported by the distal support 10 is not limited thereto.

Referring to FIG. 2, while the user is performing a flexion motion of the thigh at a hip joint of the user, a center of the hip joint of the user may move from a first position j1 to a second position j2. While the center of the hip joint is moving from the first position j1 to the second position j2, a distance from the center of the hip joint to the distal support 10 may increase from a first length 11 to a second length 12. The motion assistance apparatus 1 may implement a relative motion between the driving frame 12 and the distal support 10, thereby compensating for a change in the distance between the center of the hip joint and the distal support 10. As described further below, the distal support 10 may not slide along the distal part of the user in a direction toward the hip joint, and the distance between the center of the hip joint and the distal support 10 may change.

Referring to FIGS. 3A and 3B, a joint of the user and a joint of the motion assistance apparatus 1 misalign with each other on a frontal plane. For example, a first central axis A1 for an adduction or abduction motion of the thigh of the user, and the hinge 18 corresponding to a second central axis A2 for a rotational motion of the driving frame 12 may be spaced apart from each other on the frontal plane. In the above structure, the distal support 10 may slide in a direction away from the hip joint while applying a frictional force to the distal part of the user. In this example, the user may experience an inconvenience. The motion assistance apparatus 1 may implement the relative motion between the driving frame 12 and the distal support 10, thereby reducing a decrease in user wearability due to the frictional force applied by the distal support 10 to the distal part of the user. As described further below, the distal support 10 may not move along the distal part of the user in the direction toward the hip joint, and the distance between the center of the hip joint and the distal support 10 may change.

In summary, according to the at least one example embodiment, the relative motion between the driving frame 12 and the distal support 10 may be implemented, and thus a change in the distance between the center of the hip joint and the distal support 10 may be compensated for. Hence, the inconvenience that the user may experience may be eliminated. A device to implement the relative motion between the driving frame 12 and the distal support 10 will be described below.

Figure 4:
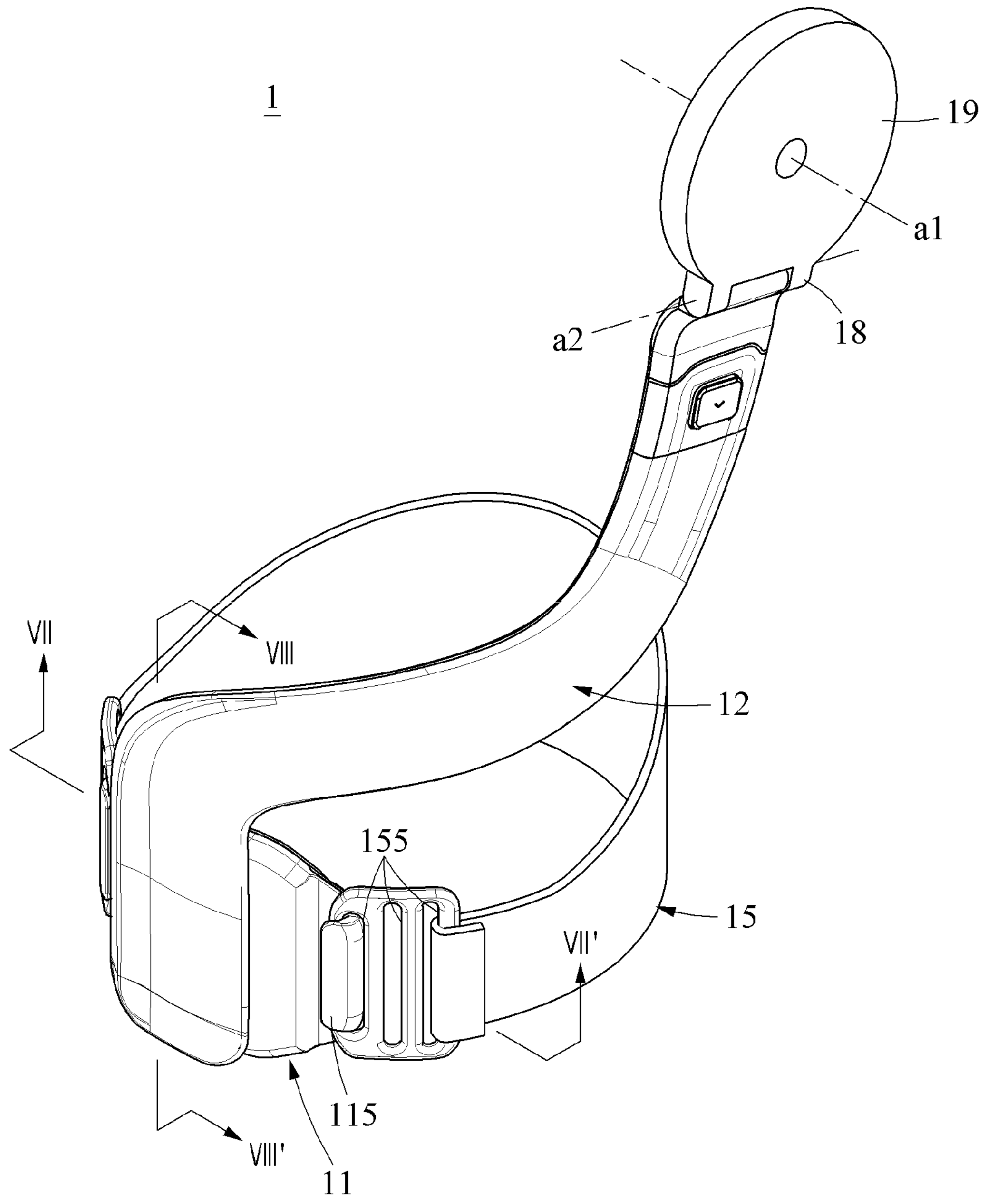
FIG. 4 is a perspective view illustrating a motion assistance apparatus according to at least one example embodiment.
Figure 5:
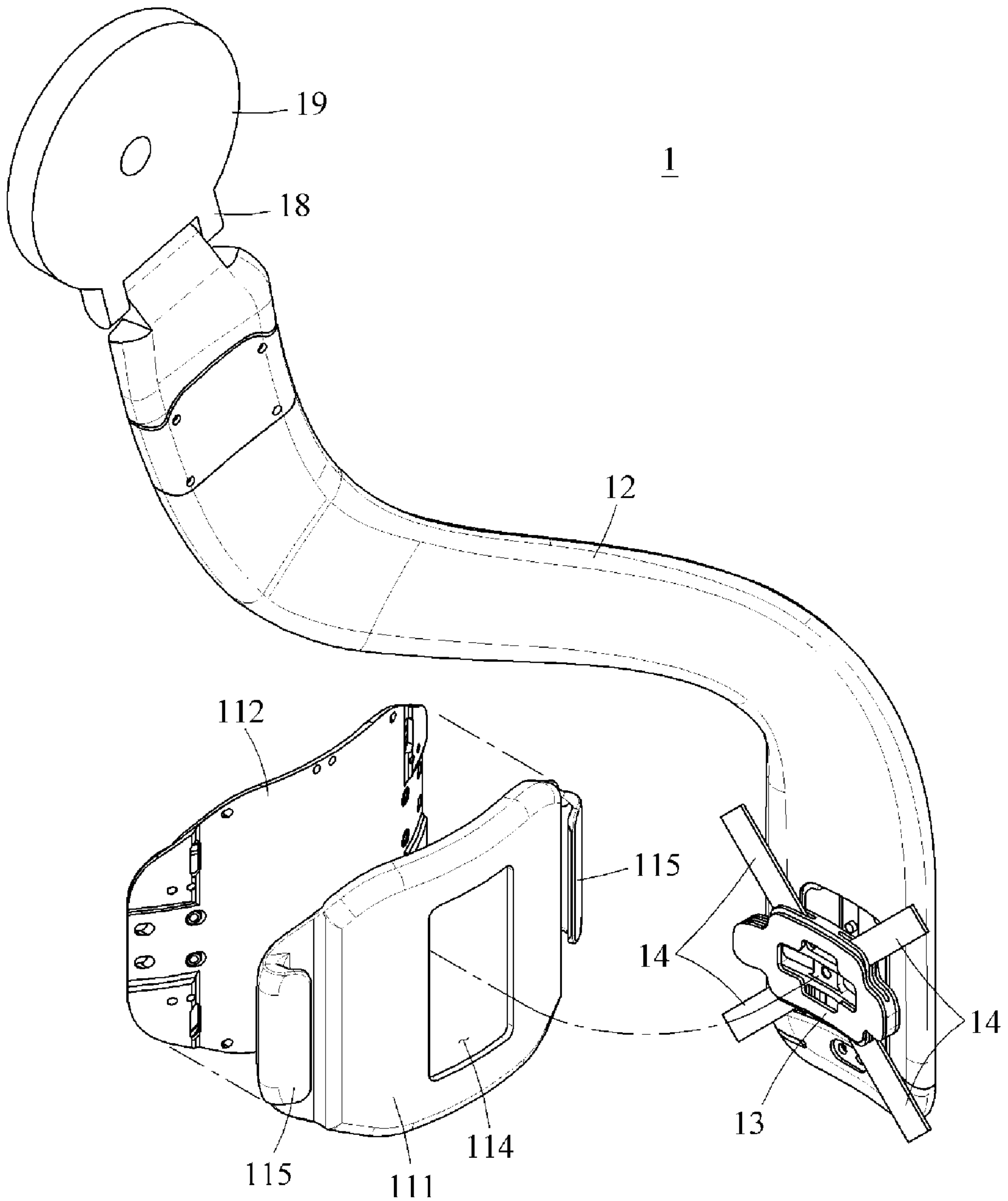
FIG. 5 is an exploded perspective view illustrating a motion assistance apparatus according to at least one example embodiment.

FIG. 4 is a perspective view illustrating a motion assistance apparatus according to at least one example embodiment. FIG. 5 is an exploded perspective view illustrating the motion assistance apparatus according to at least one example embodiment.

Referring to FIGS. 4 and 5, the motion assistance apparatus 1 may include a force transmitting frame 11, a slider 13, the driving frame 12, elastic members 14, a strap 15, the hinge 18, and the actuator 19. The force transmitting frame 11 and the strap 15 may be construed as constituents included in the distal support 10 of FIG. 1 configured to support the distal part of the user.

The force transmitting frame 11 may have a sliding space therein. The force transmitting frame 11 may include a front cover 111, a rear cover 112, a sliding space 113 of FIG. 7A, an opening 114, and strap hooks 115.

Edge portions of the front cover 111 and the rear cover 112 may be coupled to each other using, for example, screws. Any one or any combination of the front cover 111 and the rear cover 112 may have a convex shape that protrudes from an inside of the edge portions. The convex shape may form the sliding space 113 of FIG. 7A when the front cover 111 and the rear cover 112 are coupled to each other. For example, when a rear side of the front cover 111 and the front side of the rear cover 112 are in contact with each other, a space surrounded by an inner side of the convex shape of the front cover 111 and a front side (or an outer side) of the rear cover 112 may be referred to as the sliding space 113.

The rear cover 112 may be in contact with the distal part of the user. The rear cover 112 may be a plate bent to correspond to the distal part of the user so as to stably support the distal part. By the foregoing shape, a contact area between the rear cover 112 and the distal part of the user may increase, and the distal part of the user may be supported more stably. A rear side of the rear cover 112 may be in contact with the distal part of the user, and the front side of the rear cover 112 may be in contact with the front cover 111. The rear cover 112 may be in close contact with the distal part of the user. Thus, a protruding height of the motion assistance apparatus 1 from the user may be reduced, and a volume of the entire motion assistance apparatus 1 may be reduced. Further, through the close contact between the rear cover 112 and the distal part, a driving gap may be minimized.

A friction member (not shown) may be on the rear side of the rear cover 112. The friction member may prevent a slip of the rear cover 112 on the distal part of the user.

The front cover 111 may be coupled to the rear cover 112. The front cover 111 may have a convex shape to form the sliding space 113. The convex shape may be at a center of the front cover 111.

In the drawings, the front cover 111 having a convex shape and the rear cover 112 having a shape of a flat plate are illustrated. However, example embodiments are not limited thereto. For example, the rear cover 112 may have a convex shape that protrudes toward the distal part of the user, and the front cover 111 may have a shape of a flat plate. In another example, the rear cover 112 may have a convex shape that protrudes toward the distal part of the user, and the front cover 111 may also have a convex shape that protrudes in a direction away from the distal part of the user.

Figure 7A:
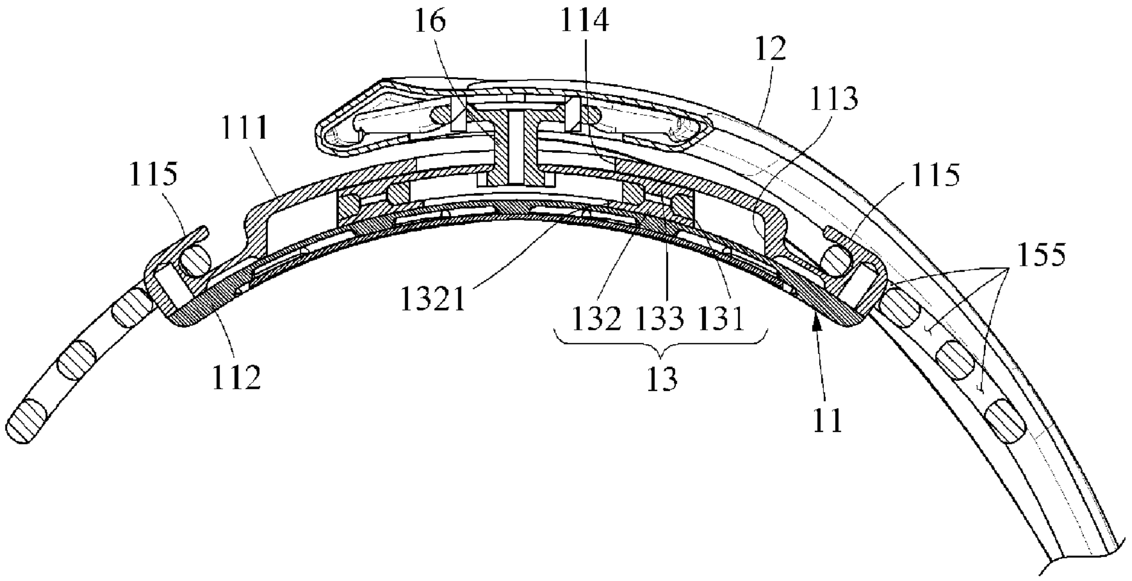
FIGS. 7A through 7C are cross-sectional views illustrating the motion assistance apparatus of FIG. 4, taken along a line VII-VII'.

The sliding space 113 of FIG. 7A may be construed as a space between the front cover 111 and the rear cover 112. When a vertical distance from a surface of the rear cover 112 to the front cover 111 is referred to as a height of the sliding space 113, the height of the sliding space 113 may be uniform.

The opening 114 may be on the front cover 111. The slider 13 in the sliding space 113 may be connected by a connecting member 16 of FIG. 7A that passes through the opening 114.

The strap hooks 115 may protrude from both sides of the force transmitting frame 11. For example, the strap hooks 115 may protrude from both side ends of the force transmitting frame 11 in a direction away from the distal part of the user, and be bent toward the opening 114. The strap 15 may be connected to the strap hooks 115.

The slider 13 may slide in the sliding space 113 of FIG. 7A. The slider 13 may move along the sliding space 113 in a direction corresponding to a length direction of the distal part of the user. Further, the slider 13 may also move along the sliding space 113 in a direction corresponding to a width direction of the distal part of the user. That is, the slider 13 may perform a 2-degree of freedom (DOF) motion in two intersecting directions in the sliding space 113.

A thickness of the slider 13 and the height of the sliding space 113 of FIG. 7A may be uniform. In a case in which the thickness of the slider 13 and the height of the sliding space 113 are uniform, the slider 13 may move smoothly in the sliding space 113 without being substantially obstructed.

The driving frame 12 may connect the slider 13 and the actuator 19. The actuator 19 may rotate the driving frame 12 on a first axis a1. When the actuator 19 is on the proximal part of the user, the driving frame 12 may rotate with respect to the proximal support 20. Further, the hinge 18 may be between the driving frame 12 and the actuator 19. The hinge 18 may rotate the actuator 19 on a second axis a2. In addition, the hinge 18 may rotate together with the driving frame 12 on the first axis a1 in response to an operation of the actuator 19. The second axis a2 may intersect the first axis a1. That is, the driving frame 12 may perform a 2-DOF rotation on the two intersecting axes a1 and a2. In the above structure, the driving frame 12 may rotate in response to the flexion or extension motion of the thigh and the adduction or abduction motion of the thigh.

The driving frame 12 may be bent. For example, the driving frame 12 may be bent such that a portion of the driving frame 12 connected to the actuator 19 may surround a side of the user, and a portion of the driving frame 12 connected to the slider 13 may surround a front of the user. In the above structure, the driving frame 12 may transmit a normal force to the distal part of the user. By transmitting the normal force to the distal part of the user, the driving frame 12 may efficiently assist the flexion or extension motion of the thigh of the user.

At least a portion of the slider 13 may overlap the force transmitting frame 11 in a direction perpendicular to the opening 114. For example, an edge portion of the slider 13 may overlap the force transmitting frame 11. Although the slider 13 slides to the maximum in one direction in the sliding space 113 of FIG. 7A, at least a portion of both sides of the slider 13 may overlap the force transmitting frame 11. Both the sides of the slider 13 may refer to two sides on opposite sides of the connecting member 16 of FIG. 6A. For example, at least a portion of a left side and a right side of the slider 13 may overlap the force transmitting frame 11. The portion of the slider 13 overlapping the force transmitting frame 11 may transmit a force or a torque to the force transmitting frame 11.

The force transmitting frame 11 and the slider 13 may be bent in one direction. For example, to increase a contact area with the distal part of the user, the force transmitting frame 11 may be bent to cover the distal part of the user. For example, the convex portions of the rear cover 112 and the front cover 111 may have shapes of bent plates, and the sliding space 113 of FIG. 7A which is the space between the rear cover 112 and the front cover 111 may be bent. In the above structure, the force transmitting frame 11 may be manufactured in a shape suitable for a circumference of a leg of the user (e.g., a shape that minimizes the protruding height of the motion assistance apparatus 1), and sliding of the slider 13 may also be implemented.

The slider 13 may be bent to have a curvature substantially equal to a curvature of the force transmitting frame 11. In the above structure, the slider 13 may smoothly slide in the bent sliding space 113. Further, the slider 13 may perform a translational motion in the sliding space 113, without performing a rotational motion, whereby an unnecessary DOF motion may be eliminated and a mechanical durability may be improved.

For example, the slider 13 may perform a 2-DOF motion in the sliding space 113. The slider 13 may slide in a length direction and a width direction of the sliding space 113. Here, the length direction of the sliding space 113 refers to a vertical direction of FIG. 6A, and the width direction of the sliding space 113 refers to a lateral direction of FIG. 6A.

When the slider 13 and the sliding space 113 are bent, a rotation of the slider 13 may be restricted. In this example, the slider 13 and the driving frame 12 may move as an integral body, and a relative rotation between the slider 13 and the force transmitting frame 11 may be restricted. Thus, when the driving frame 12 rotates on the second axis a2, the force transmitting frame 11 may rotate together with the driving frame 12 on the second axis a2. That is, the relative rotation between the slider 13 and the force transmitting frame 11 may be restricted, and thus the force transmitting frame 11 may rotate on the second axis a2 without sliding with respect to the driving frame 12.

The plurality of elastic members 14 may connect the force transmitting frame 11 and the slider 13. The plurality of elastic members 14 may be materials having elasticity. For example, the plurality of elastic members 14 may be elastic bands or springs. At least one of the plurality of elastic members 14 may expand or contract when a distance between the slider 13 and a center of the force transmitting frame 11 increases. Referring to FIG. 5, when a base of the slider 13 is an approximately rectangle, an end of each of the plurality of elastic members 14 may be connected to each vertex of the slider 13. However, a shape of the slider 13 and connection positions of the plurality of elastic members 14 are not limited thereto.

When an external force is not applied to the slider 13, the plurality of elastic members 14 may return the slider 13 to its initial position. For example, in a case in which the initial position of the slider 13 is the center of the force transmitting frame 11, at least one of the plurality of elastic members 14 may stretch when the slider 13 is away from the center of the force transmitting frame 11, thereby applying a tensile force to the slider 13 to pull the slider 13 to the initial position.

The actuator 19 may be connected to one end of the driving frame 12 to drive the driving frame 12. The actuator 19 may be on one side of the proximal support 20 of FIG. 1. The actuator 19 may rotate the driving frame 12 on the first axis a1.

The strap 15 may be attached to and detached from both sides of the force transmitting frame 11. The strap 15 may have an adjustable length. For example, the strap 15 may include a length adjuster, or an elastic material. The strap 15 may include a plurality of strap slots 155 at intervals in a length direction of the strap 15. The strap hooks 115 on both sides of the force transmitting frame 11 may each be inserted into one of the strap slots 155. The user may adjust a circumference of the distal support 10 of FIG. 1 by selecting a strap slot 155 into which each of the strap hooks 115 is to be inserted from among the plurality of strap slots 155. In the above structure, the distal support 10 may fit a body of the user, and the user may easily adjust the circumference of the distal support 10 even with one hand. The strap 15 may push a rear of the thigh when the user performs a flexion motion of the thigh.

A friction member (not shown) may be on an inner circumference surface of the strap 15. The friction member may prevent a slip of the strap 15 on the distal part of the user.

The motion assistance apparatus 1 may further include a sensor (not shown) and a controller (not shown).

The sensor may sense a force or a torque applied between the driving frame 12 and the slider 13. For example, the sensor may be between the driving frame 12 and the slider 13, or between the slider 13 and the force transmitting frame 11. However, a position of the sensor is not limited thereto. For example, the sensor may be a force-torque (FT) sensor using a strain gauge.

The controller may control the actuator 19 based on information measured by the sensor. The controller may be in the distal support 10. However, a position of the controller is not limited thereto. The controller may optimize a force to be applied to the user. For example, a power generated by the actuator 19 may be reduced in a process of being transmitted to the force transmitting frame 11. When a force or a torque measured by the sensor is less than an optimal force to assist walking of the user, the controller may control the actuator 19 to generate a greater torque. Further, the controller may prevent an application of a force or a torque that strains a joint of the user. When a magnitude of the force or the torque measured by the sensor is greater than a set value, the controller may stop the operation of the actuator 19.

Figure 6A:
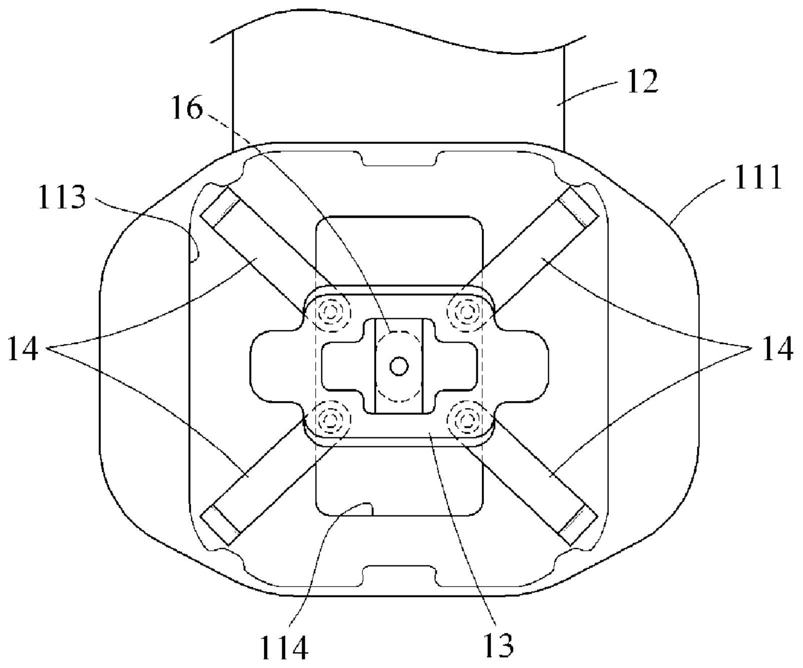
FIGS. 6A through 6C illustrate a slider connected to a force transmitting frame according to at least one example embodiment.
Figure 6B:
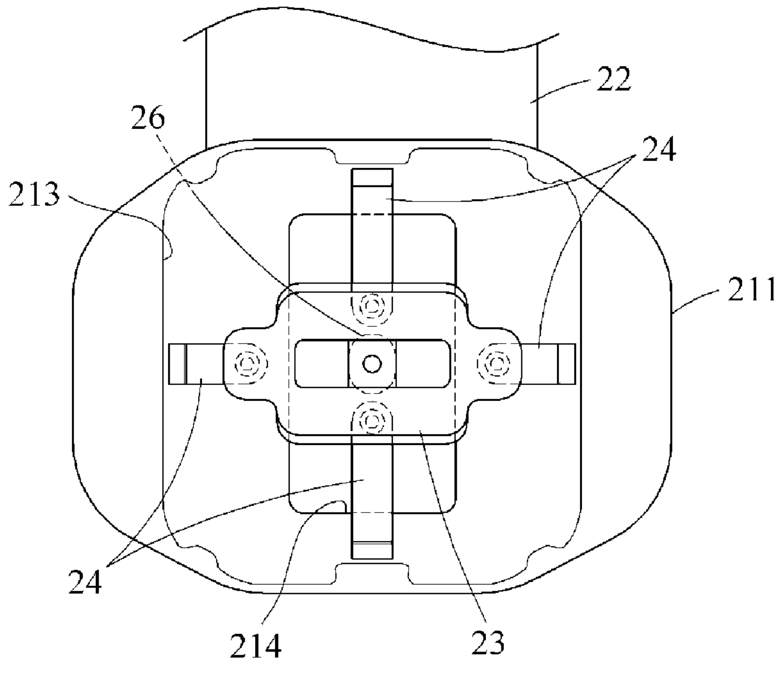
Figure 6C:
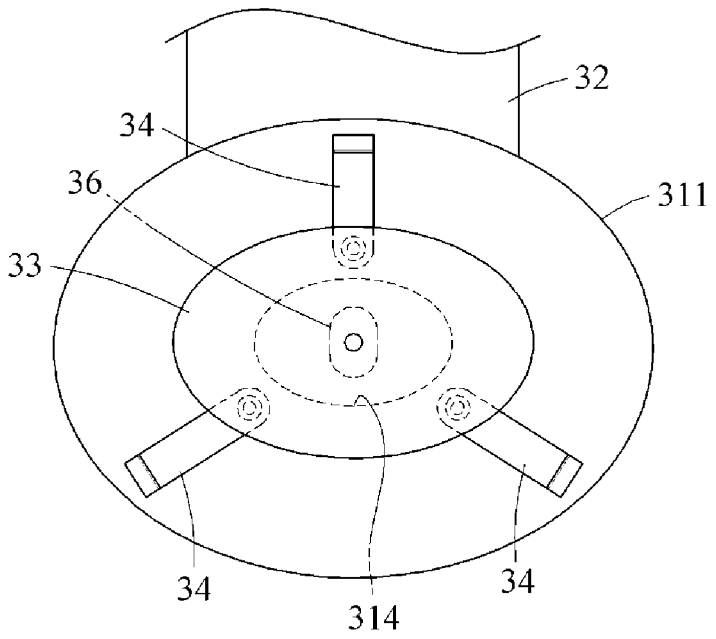

FIGS. 6A through 6C illustrate a slider connected to a force transmitting frame according to at least one example embodiment.

Referring to FIGS. 6A through 6C, a shape of a slider 13, 23, 33 and connection positions of a plurality of elastic members 14, 24, 34 may vary.

Referring to FIG. 6A, the plurality of elastic members 14 may be symmetrically connected to four vertices of the slider 13. When the slider 13 moves upward along the sliding space 113, two lower elastic members 14 of the plurality of elastic members 14 may expand. When the slider 13 moves leftward along the sliding space 113, two right elastic members 14 of the plurality of elastic members 14 may expand. Referring to FIG. 6B, the plurality of elastic members 24 may be symmetrically connected to four edges of the slider 23.

Referring to FIG. 6C, the shape of the slider 33 may be a circle. A shape of the sliding space 113 may also be a circle. The plurality of elastic members 34 may be connected to be spaced apart from each other at desired (or alternatively, predetermined) intervals along a circumference of the slider 33.

Figure 7B:
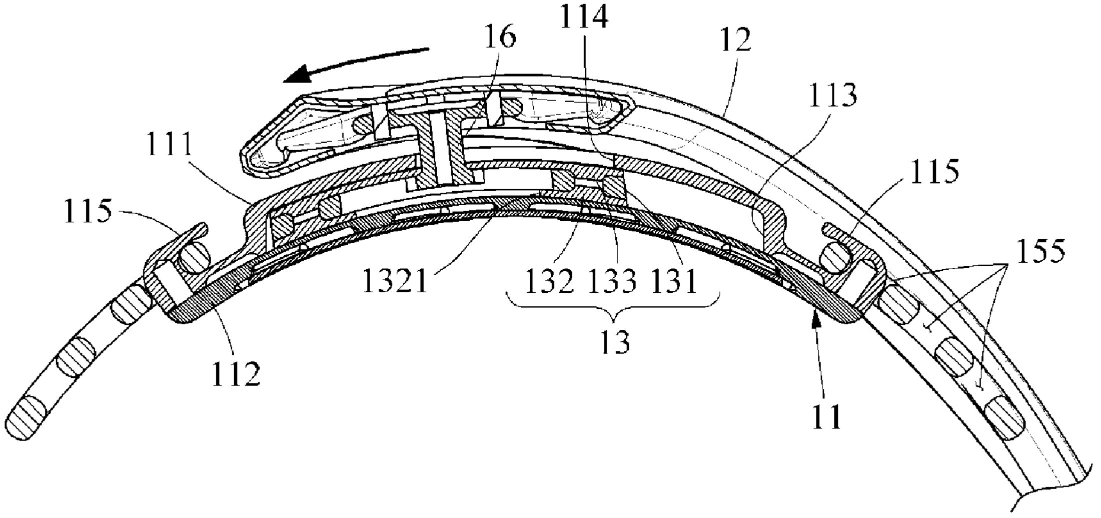
Figure 7C:
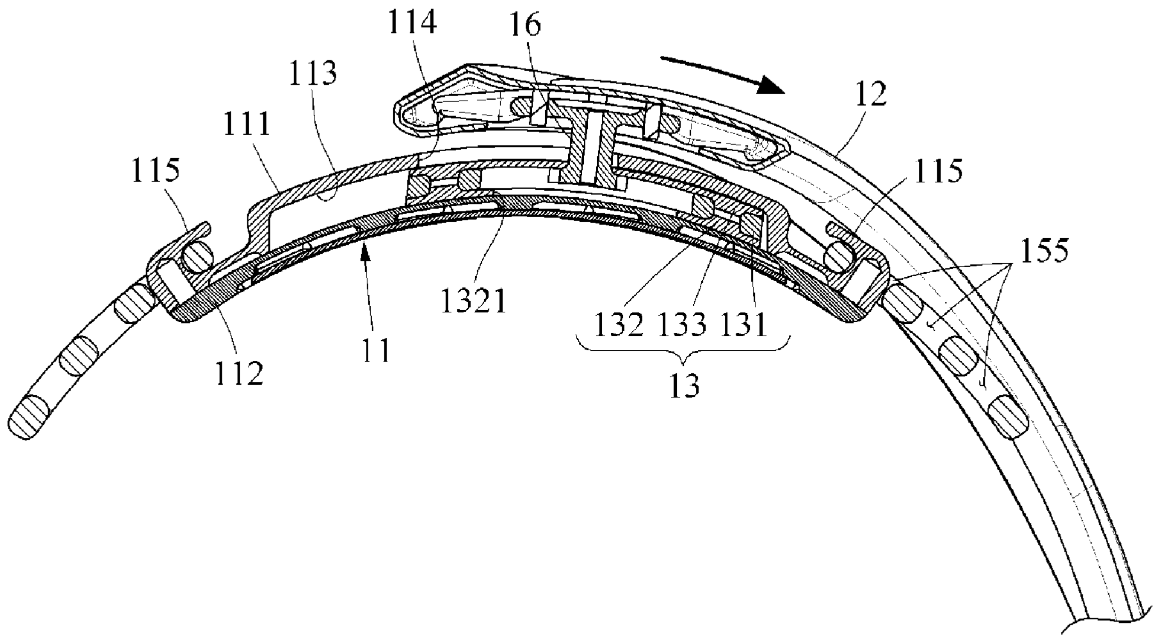

FIGS. 7A through 7C are cross-sectional views illustrating the motion assistance apparatus of FIG. 4, taken along a line VII-VII'. The plurality of elastic members 14 are not shown in FIGS. 7A through 7C to simplify the drawings.

FIGS. 7A through 7C illustrate a movement of the slider 13 when the user performs an internal rotation and an external rotation of the thigh. FIG. 7A illustrates an initial state of the slider 13. FIG. 7B illustrates a movement of the slider 13 when the user performs the internal rotation of the thigh. FIG. 7C illustrates a movement of the slider 13 when the user performs the external rotation of the thigh.

Referring to FIG. 7B, when the user performs the internal rotation of the thigh, the slider 13 may slide in a direction of an arrow in the sliding space 113. In response to the sliding of the slider 13, the force transmitting frame 11 may move relative to the driving frame 12. When the user performs the internal rotation of the thigh, the force transmitting frame 11 may move together with the thigh of the user. In the above structure, the user may perform the internal rotation of the thigh without experiencing any substantial inconvenience while wearing the motion assistance apparatus 1.

Referring to FIG. 7C, when the user performs the external rotation of the thigh, the slider 13 may slide in a direction of an arrow in the sliding space 113. In response to the sliding of the slider 13, the force transmitting frame 11 may move relative to the driving frame 12. When the user performs the external rotation of the thigh, the force transmitting frame 11 may move together with the thigh of the user. In the above structure, the user may perform the external rotation of the thigh without experiencing any substantial inconvenience while wearing the motion assistance apparatus 1.

The slider 13 may include a body plate 131 and slip plates 132, 133. The slip plates 132, 133 may include a bottom slip plate 132 attached to a bottom surface of the body plate 131, and a top slip plate 133 attached to a top surface of the body plate 131.

At least one of the slip plates 132, 133 may include a material with a small coefficient of friction. For example, the material of the slip plate 132, 133 may be Teflon®.

At least one of the slip plates 132, 133 may include a friction reducer 1321 configured to reduce a friction between the slip plate 132, 133 and the force transmitting frame 11. For example, the friction reducer 1321 may be a hole at a center portion of the bottom slip plate 132. The friction reducer 1321 may reduce a friction area between the bottom slip plate 132 and the rear cover 112.

The connecting member 16 may connect the slider 13 and the driving frame 12. One of the slider 13 and the driving frame 12 may include the connecting member 16. For example, the connecting member 16 may be provided as an integral body with one of the slider 13 and the driving frame 12.

Figure 8A:
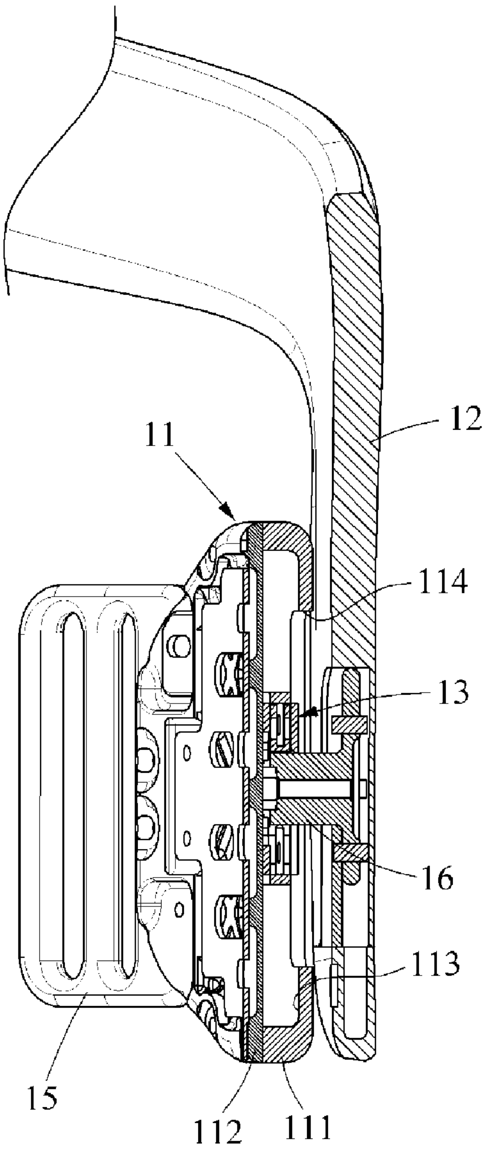
FIGS. 8A through 8C are cross-sectional views illustrating the motion assistance apparatus of FIG. 4, taken along a line VIII-VIII'.
Figure 8B:
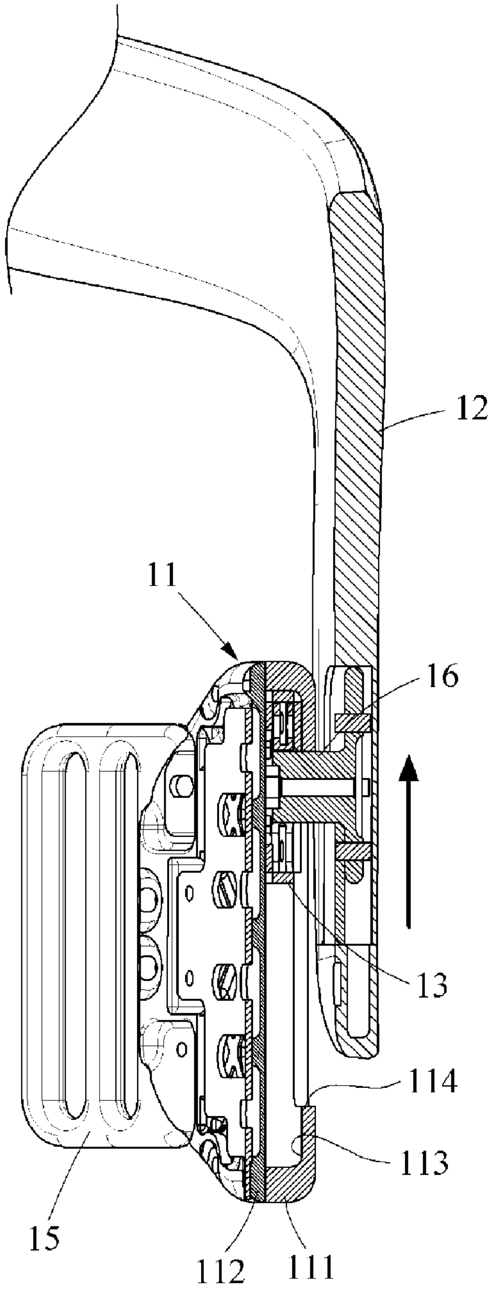
Figure 8C:
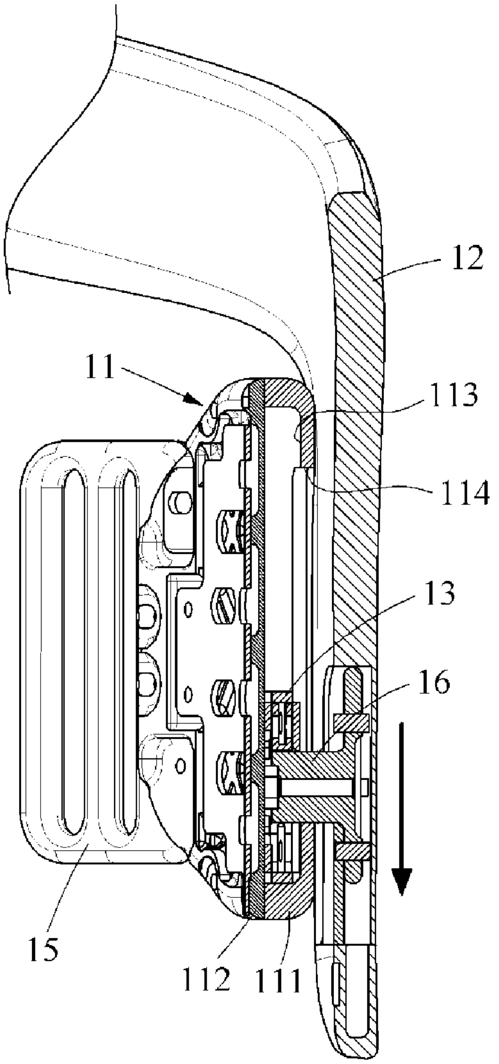

FIGS. 8A through 8C are cross-sectional views illustrating the motion assistance apparatus of FIG. 4, taken along a line VIII-VIII'. Prior to description, the plurality of elastic members 14 is not shown in FIGS. 8A through 8C to simplify the drawings.

FIG. 8A illustrates an initial state of the slider 13. FIG. 8B illustrates a movement of the slider 13 when the user performs a flexion motion of the thigh or an adduction motion of the thigh. FIG. 8C illustrates a movement of the slider 13 when the user performs an extension motion of the thigh or an abduction motion of the thigh.

Referring to FIG. 8B, when the user performs the flexion motion of the thigh, the slider 13 may slide in a direction of an arrow in the sliding space 113. In response to the sliding of the slider 13, the force transmitting frame 11 may move relative to the driving frame 12. When the user performs the flexion motion of the thigh, the force transmitting frame 11 may move together with the thigh of the user. In the above structure, although the center of the hip joint moves as shown in FIG. 2 in response to the flexion motion of the thigh, the slider 13 may slide in the direction of the arrow, thereby compensating for the movement of the center of the hip joint. Thus, the user may perform the flexion motion of the thigh without experiencing any substantial inconvenience while wearing the motion assistance apparatus 1.

Similarly, despite a misalignment between a rotation axis of the driving frame 12 (e.g., the second axis a2 of FIG. 4), and an adduction and abduction axis of the thigh on a frontal plane as shown in FIG. 4, the slider 13 may slide in the direction of the arrow, thereby compensating for the misalignment. In the above structure, the user may perform the adduction motion of the thigh without experiencing any substantial inconvenience while wearing the motion assistance apparatus 1.

Referring to FIG. 8C, when the user performs the extension motion of the thigh, the slider 13 may slide in a direction of an arrow in the sliding space 113. In response to the sliding of the slider 13, the force transmitting frame 11 may move relative to the driving frame 12. When the user performs the extension motion of the thigh, the force transmitting frame 11 may move together with the thigh of the user. In the above structure, although the center of the hip joint moves as shown in FIG. 2 in response to the extension motion of the thigh, the slider 13 may slide in the direction of the arrow, thereby compensating for the movement of the center of the hip joint. Thus, the user may perform the extension motion of the thigh without experiencing any substantial inconvenience while wearing the motion assistance apparatus 1.

Similarly, despite a misalignment between a rotation axis of the driving frame 12 (e.g., the second axis a2 of FIG. 4), and an adduction and abduction axis of the thigh on a frontal plane as shown in FIG. 4, the slider 13 may slide in the direction of the arrow, thereby compensating for the misalignment. In the above structure, the user may perform the abduction motion of the thigh without experiencing any substantial inconvenience while wearing the motion assistance apparatus 1.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A motion assistance apparatus, comprising:

a force transmitting frame configured to be located on and configured to support a distal part of a user, the force transmitting frame including a front cover, a rear cover, and a sliding space between the front cover and the rear cover;

a slider connected to the force transmitting frame and configured to slide along the sliding space of the force transmitting frame;

a plurality of elastic members connecting the force transmitting frame and the slider; and a driving frame, which is an integral body, that includes a proximal portion configured to surround a side of the user and a distal portion configured to extend from and bent with respect to the proximal portion and configured to surround a front of the user, the distal portion of the driving frame connected to the slider, and the driving frame configured to rotate with respect to a proximal part of the user, wherein the force transmitting frame is configured to move relative to the distal portion of the driving frame, and wherein the force transmitting frame and the distal portion of the driving frame overlap each other with respect to a direction in which the distal portion of the driving frame is for facing the user.

2. The motion assistance apparatus of claim 1, wherein at least one of the plurality of elastic members is configured to expand or contract when a distance between the slider and a center of the force transmitting frame changes.

3. The motion assistance apparatus of claim 1, wherein the slider comprises:

a body plate in the slider, and at least one slip plate attached to any one or any combination of a top surface and a bottom surface of the body plate.

4. The motion assistance apparatus of claim 3, wherein the at least one slip plate comprises a friction reducer configured to reduce a friction between the slip plate and the force transmitting frame.

5. The motion assistance apparatus of claim 3, wherein at least one of the slider and the driving frame comprises a connecting member configured to connect the slider and the driving frame.

6. The motion assistance apparatus of claim 5, wherein the connecting member is configured to pass through the opening.

7. The motion assistance apparatus of claim 6, wherein at least a portion of the slider is configured to overlap the force transmitting frame based on a direction perpendicular to the opening.

8. The motion assistance apparatus of claim 1, wherein the force transmitting frame and the slider are bent in one direction.

9. The motion assistance apparatus of claim 8, wherein the force transmitting frame is bent in a direction to cover the distal part of the user.

10. The motion assistance apparatus of claim 9, wherein a curvature of the force transmitting frame is substantially equal to a curvature of the slider.

11. The motion assistance apparatus of claim 1, further comprising:

a strap configured to be attached to and detached from both sides of the force transmitting frame.

12. The motion assistance apparatus of claim 11, wherein the force transmitting frame comprises strap hooks protruding from both sides thereof, the strap comprises a plurality of strap slots at intervals in a length direction thereof, and each of the strap hooks is inserted into a corresponding one of the plurality of strap slots.

13. The motion assistance apparatus of claim 1, further comprising:

an actuator connected to one end of the driving frame, and configured to drive the driving frame.

14. The motion assistance apparatus of claim 13, further comprising:

a sensor configured to sense at least one of a force or a torque applied between the driving frame and the slider; and a controller configured to control the actuator based on information measured by the sensor.

15. The motion assistance apparatus of claim 1, wherein the distal part is a thigh of the user, and the proximal part is any one or any combination of a waist and/or a pelvis of the user.

* * * * *